Figure 1:
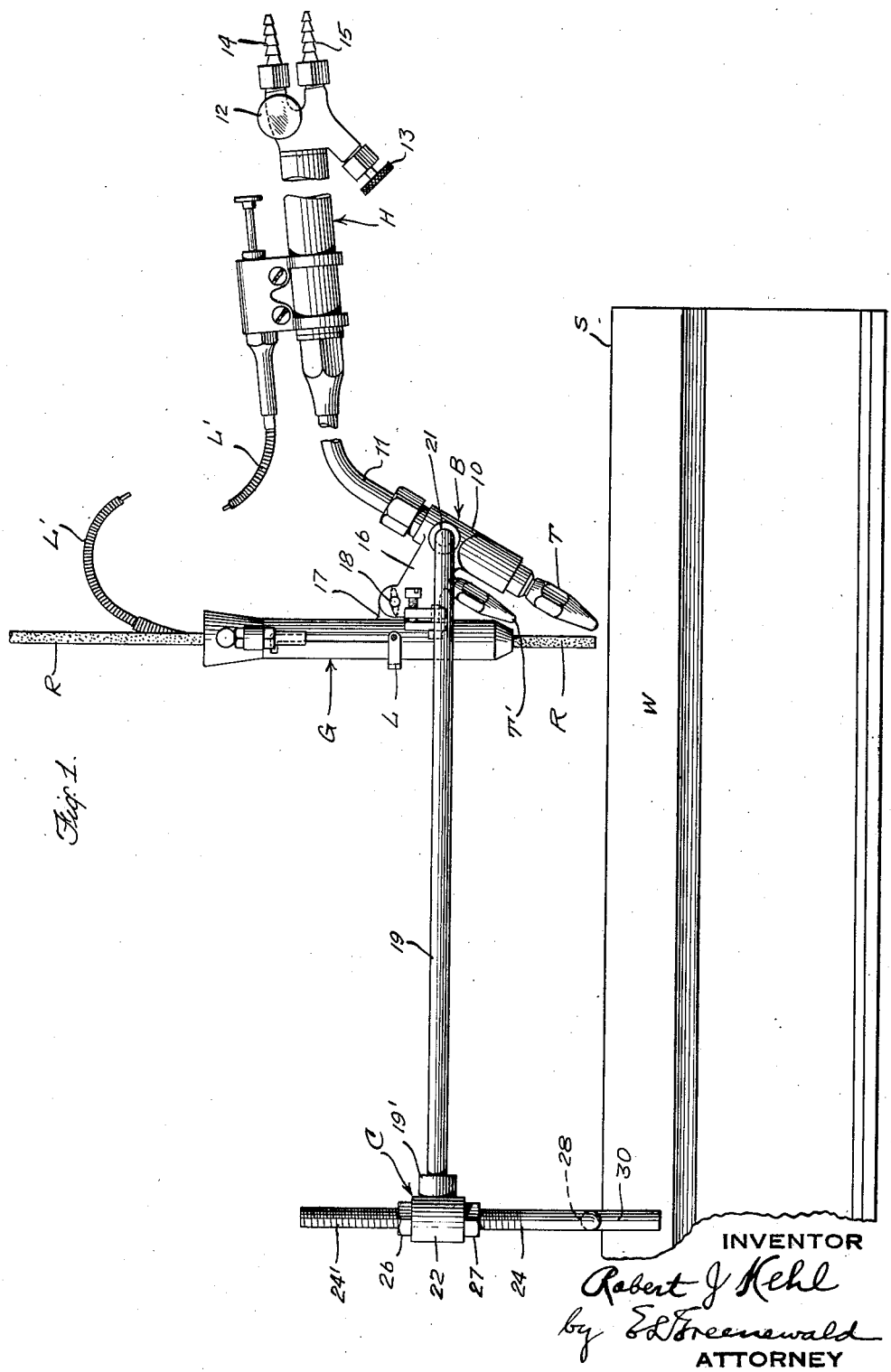

Dec. 5, 1939.  R. J. KEHL  2,181,974
HEATING BROAD SURFACES
Filed Aug. 4, 1932  2 Sheets-Sheet 1.

INVENTOR
Robert J Kehl
by E L Greenewald
ATTORNEY

Dec. 5, 1939.  R. J. KEHL  2,181,974
HEATING BROAD SURFACES
Filed Aug. 4, 1932  2 Sheets-Sheet 2

INVENTOR
Robert J Kehl
by E L Greenewald
ATTORNEY

Patented Dec. 5, 1939

2,181,974

UNITED STATES PATENT OFFICE 2,181,974

HEATING BROAD SURFACES

Robert J. Kehl, Bayside, N. Y., assignor, by mesne assignments, to Union Carbide and Carbon Corporation, a corporation of New York Application August 4, 1932, Serial No. 627,419

35 Claims. (Cl. 113—59)

This invention relates to a method and apparatus for heating, welding and cutting, and more particularly to improvements in the high-temperature heating of broad surfaces, as in building up worn or battered railroad rail ends.

It has been the practice to build up the surfaces of rails at points where they are worn by depositing thereon metal from a welding rod melted by high-temperature heat supplied by a hand welding blowpipe of the usual single flame type. This operation is fatiguing and slow, since the operator must hold the welding rod with one hand while he is manipulating the blowpipe with the other; and in order to vary the welding flame it is necessary to adjust the blowpipe valves, which causes occasional interruption of the operation. Furthermore, the success of uniformly depositing a layer of metal on a surface depends upon an even distribution of heat on the surface to which the weld metal is being applied. When the heat is evenly distributed over the surface to be built up, the molten rod metal flows uniformly and quickly over the heated area, providing an even deposit of metal.

Accordingly, an object of the present invention is to provide apparatus for heating the surface of a rail or the like, and for heating relatively broad surfaces, wherein the greater part of the weight of a blowpipe, or similar means for applying high temperature heat to the work, is supported accurately on the work. A further object is to provide a method for heating and depositing weld metal upon relatively broad surfaces. Another object is to provide apparatus for practicing the method wherein the weight of the welding rod and the greater part of the weight of the blowpipe are supported on and accurately guided along the surface, such as a rail, to enable the operator to perform the work easily and speedily and with much less interruption, thereby producing more uniform high quality results. Another object is to provide a carriage for such apparatus in which the work-engaging support is placed well away from the heating or welding zone so that, even with the longest length of heating or welding that is likely to be encountered in building up rail ends, the support will travel on a smooth surface and not on a part onto which weld metal has been deposited. Another object of the invention is to provide an apparatus of this type in which the heating flame may be more uniformly distributed over a greater area of the work, and in which the means for producing such a heating flame and the means for guiding the weld metal are connected together as a unit to enable the operator to manipulate the same with one hand.

Figure 2:
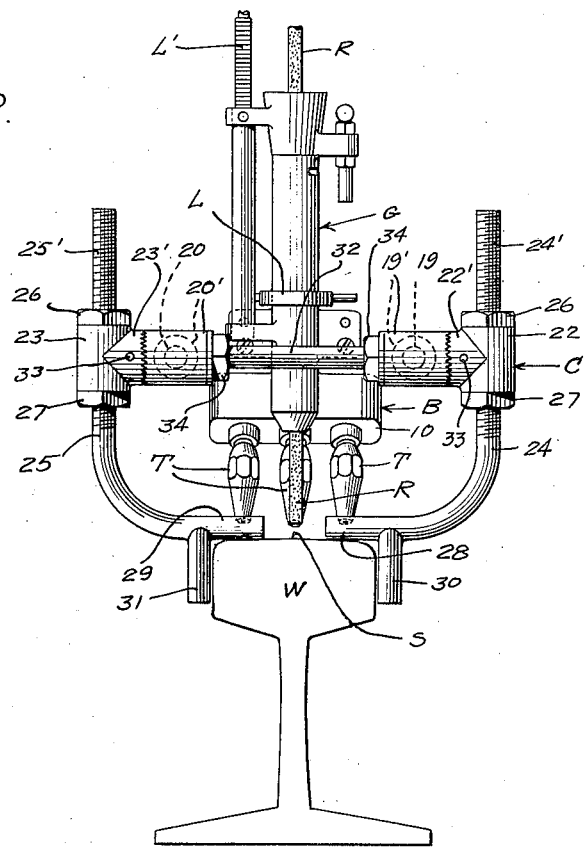
Figure 3:
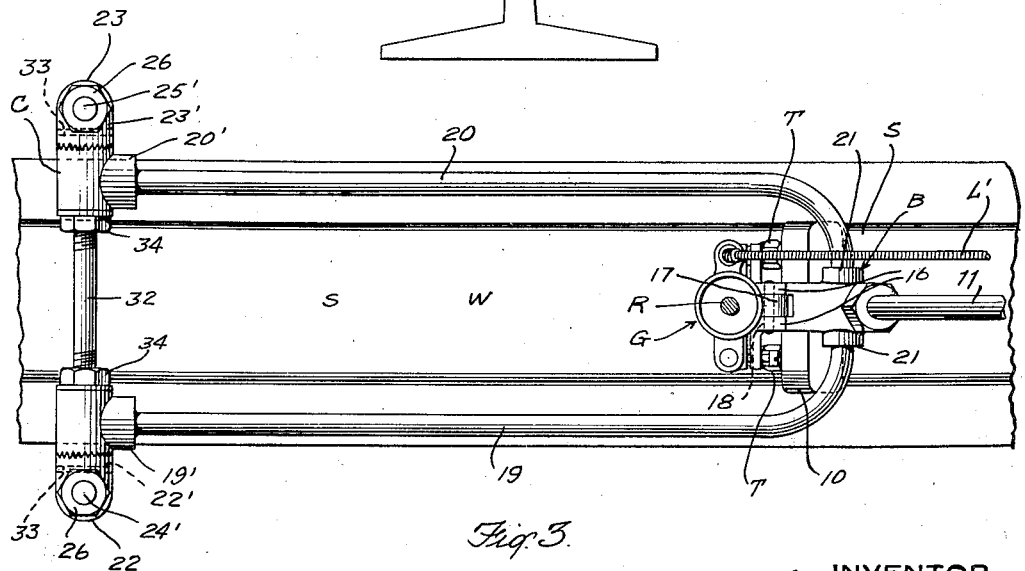

The above and other objects and the novel features of the invention will be apparent from the following description taken in connection with the accompanying drawings, in which Fig. 1 is a side view of an apparatus embodying this invention and with which the method may be carried out; and Figs. 2 and 3, respectively, are a rear end view and a top plan view of the same.

In order to disclose the principles of this invention, a form of the improved apparatus especiallly adapted for carrying out the method in building up rail ends is disclosed in the drawings. However, certain features of the invention are also applicable in heating metal surfaces generally; for applying weld metal for other purposes; and for use in cutting by means of jets of gaseous heating and oxidizing agents. Generally speaking, the improved apparatus as shown comprises means for providing high-temperature heat, such as an oxy-acetylene blowpipe B; a guide G for guiding suitable material, such as a metal welding rod R, to the region heated by the blowpipe; and a carriage C which guides and at least partially supports the blowpipe and the rod guide as a unit along and upon the work such as the rail W.

The blowpipe B comprises a head 10 having a gas-distributing passage (not shown) adapted to receive a suitable combustible mixture of gases, such as oxygen and acetylene, and distribute the same to one or more detachable welding tips T and one or more detachable tips T' for producing flame for preheating the welding rod or rods fed through the guide means. Other types of orifices may, of course, be employed to suitably deliver combustible gas to provide a wide sheet of heating or welding flame and suitable flame to preheat one or more welding rods. The combustible gaseous mixture is desirably supplied to the head 10 through a relatively long rigid tube 11 leading from a gas mixer (not shown) in the handle H, which handle carries valves 12 and 13 controlling the flow of oxygen and acetylene from separate supply tubes 14 and 15, respectively, into the mixer.

The sheet of flame produced by the combustible gas delivered by the head 10 extends transversely of the direction of movement of the apparatus and is desirably about the same width as the surface to be heated, and thus evenly heats the work along an area substantially perpendicular to the rail edges. In the apparatus shown, a single welding rod is fed substantially into the center of the wide heating flame approximately at the work surface, the rod being preheated by the single centrally disposed preheating tip T', which is directly above the central tip T of the three main heating or welding tips. Accordingly, melted weld metal from the rod R flows laterally as well as centrally in all directions over the properly heated surface to quickly deposit a homogeneous layer of substantially uniform thickness.

The blowpipe head 10 and the welding rod guide G are preferably connected together as a unit and are adjustable at will relatively to each other, so that the blowpipe tips may be set to most effectively apply their flames to the work and to the welding rod to be melted and deposited. To this end, the blowpipe head and the rod guide may be provided with overlapping or interfitting extensions 16 and 17, apertured to receive a pivot pin 18 which may be loosened and tightened by a suitable finger piece to secure the desired adjustments.

The unit comprising the multiple-tip blowpipe and the rod guiding means may be manipulated by one hand of the operator holding the handle H, his other hand being free to adjust the valves 12, 13 and to adjust the welding rod in its guide, preferably by means of a rod adjusting and lifting device L operable through suitable connections L' from the handle H, as more fully disclosed in application Serial No. 576,893 filed November 23, 1931, in the name of John M. Halbing and Robert J. Kehl, now United States Patent No. 1,994,700.

It is, however, preferable to support at least part of the weight of the appliance directly on the work in order to render the operation easier and to increase the speed and uniformity of the work performed. A suitable carriage C is therefore provided both to guide the appliance along the work and to support a portion of its weight upon the work. As shown, the carriage may include a pair of spaced substantially parallel arms 19 and 20, which may be bent at one end thereof and secured to opposite sides of the welding unit, as at 21 to the blowpipe head 10. The connection of the arms to the welding unit is preferably a rigid one, but suitable adjusting means may be provided at this point to permit a relative adjustment of the carriage and the welding unit. The other ends of the arms 19 and 20 terminate in collars 19' and 20', rigidly secured thereto and provided with milled outer faces adapted to interfit in any one of a number of adjusted positions with correspondingly milled faces on the inner sides of right-angle extensions 22', 23' on the inner sides of tubular brackets 22 and 23 which carry the guide runners 24 and 25. The brackets 22, 23 have threaded bores to receive the threaded stems 24' and 25' of the guide runners 24, 25, which runners are arranged to be held in any adjusted position by lock nuts 26, 27 fitting the threaded stems and bearing against the upper and lower sides of the brackets. The lower ends of the guide runners have supporting and guiding elements and, as shown, are preferably forked to provide opposed horizontal limbs 28, 29 to engage the top of a rail head or the like and vertical limbs 30, 31 to engage the opposite side edges of the rail head or other work. The two guide runners are rigidly connected together by a cross bar 32, the ends of which are secured in bores in the bracket extensions 22', 23' by pins 33. The rod 32 also extends through bores in the collars 19' and 20' whereby the guide runner assembly is secured to the arms 19 and 20 of the carriage. The rod 32 has threaded portions adjacent the collars 19', 20' to receive lock nuts 34 which may be loosened or tightened against the collars 19', 20' to force the milled faces of the latter into engagement with the milled faces on the extensions 22', 23' to adjust and secure the guide-runner assembly in any one of a number of angular positions relatively to the plane of the carriage arms 19, 20.

The apparatus is shown in position for building up the end top surface S of a battered rail head W. The operator holding the handle H may raise and lower the blowpipe head 10 to vary the heating effect of the flame on the surface S and also to vary the preheating of the welding rod R. The number of blowpipe tips may be varied, it being desirable to deliver a sheet of flame substantially the width of the surface to be treated. In this manipulation, the unit comprising the blowpipe and the welding rod guide is rocked or swung about an axis which, with respect to the direction of movement of the unit, is behind and located longitudinally of the rail head at a substantial distance away from the welding point or the point of application of the heating flame, and in this instance the fulcrum is along the line of contact of the limbs 28, 29 with the top of the rail head. During manipulation, the appliance may be moved back and forth over the surface to be built up in order to deposit several layers of metal, if desired; and the length of the carriage arms 19, 20 is desirably such that the guide-runner assembly is always located at a substantial distance from the surface to be built up, heat treated or cut, so that the limbs 28, 29 will not engage the hotter metal or finished work. A small clearance between the vertical limbs 30, 31 and the edges of the rail or other work allows the operator to move the handle of the blowpipe laterally across the rail and in so doing to assist the flow of weld metal to the edges of the surface to be built up.

While the apparatus as here shown is particularly advantageous for building up rail heads by depositing weld metal thereon, it will be understood that the principles of the invention may be embodied in apparatus for heating rail heads and other metal surfaces, in which event the welding rod guide and welding rod may be omitted; also an oxy-acetylene cutting blowpipe may be substituted for the welding unit shown and the apparatus may then be used for guiding and manipulating such cutting blowpipe in cutting metals. Moreover, in some instances, one or more electric arcs may be substituted for the gaseous high-temperature heating means herein shown. Other changes may be made in the apparatus as shown and described without departing from the principles of the invention or sacrificing any of its advantages.

I claim:

1. In hand welding apparatus of the class described, the combination of means for applying high-temperature heat to work; supporting means for such heating means movable along the work; and means associated with said supporting means adapted to engage both lateral edges of the top surface of the work to guide the apparatus.

2. The combination of means for applying high-temperature heat to a rail head or the like; means adapted to support such heating means on the rail head; said support serving as a fulcrum about which the heating means may be angularly manipulated; and means adapted to engage the lateral edges of the rail head to guide the heating means lengthwise of the rail.

3. The combination of means for applying high-temperature heat to work; means slidably engaging the surface of the work to support and fulcrum said heating means during the application of heat; and means cooperating with the edge of the work and adapted to guide the apparatus along the work.

4. In blowpipe apparatus for heating, welding and cutting, the combination of a blowpipe adapted to apply high-temperature heat to work; means for rockably and slidably supporting said blowpipe on the work during the application of heat; and means cooperating with an edge of the work for guiding the blowpipe along the work.

5. The combination with means for applying high-temperature heat to work, of a carriage therefor comprising elements to rockably support the carriage for movement along the work during the application of heat, and at least one element cooperating with an edge of the work to guide the carriage during such movement.

6. The combination with means for applying high-temperature heat to work, of a carriage therefor comprising guide-runners adapted to support and fulcrum the carriage on the work and to engage edges of the work to guide the carriage.

7. The combination with means for applying high-temperature heat to work, of a carriage therefor comprising a pair of guide-runners having limbs to engage the top surface and side edges of the work.

8. The combination with means for applying high-temperature heat to work, of a carriage therefor comprising a pair of arms and a pair of guide-runners adjustably connected to said arms, each runner having a pair of limbs, one to engage the top surface of the work and the other to engage a lateral edge of the work.

9. The combination of a carriage movable along the work, means thereon for producing a heating flame at least several times wider transversely of the direction of movement than longitudinally of such direction, and means cooperating with a normal lateral edge of the work for guiding said carriage along a path determined by the contour of said normal lateral edge.

10. The combination of means for producing a high-temperature heating flame at least several times wider in one direction than the other direction, means for guiding at least one welding rod into said flame at a point intermediate the edges thereof, and means arranged above said high temperature heating flame for preheating said welding rod.

11. The combination of means for producing a wide high-temperature heating flame of sheet-like form, means for guiding a welding rod substantially centrally into said flame between the edges thereof, and a carriage for supporting at least part of the weight of such heating means and guiding means upon the work, the construction and arrangement of the parts being such that the work will be uniformly heated throughout the width of the sheet-like flame and the weld material will be deposited in a uniform layer substantially over the entire heated area.

12. The combination of means for producing a wide heating flame, means for guiding welding rod into said flame at a region intermediate the edges thereof, and means for preheating said rod, said preheating means being arranged centrally above said flame-producing means and being independent thereof.

13. The combination of means for producing a wide heating flame; means for guiding a welding rod into said flame at a region substantially midway between the edges thereof; means spaced from the region said heating flame acts upon said welding rod for preheating the latter; and a carriage adapted to support such heating means, guiding means and preheating means for movement along the work.

14. In welding apparatus the combination of a blowpipe having an elongated head provided with means for delivering a wide heating flame of sheet-like form and independent means for delivering a preheating flame adjacent and above said heating flame at a region intermediate the edges thereof.

15. In welding apparatus, the combination of means for producing a relatively wide heating flame of sheet-like form, and means for producing a preheating flame above and adjacent said heating flame at a region between the edges thereof.

16. In welding apparatus, the combination of a blowpipe provided with an elongated head, a series of aligned tips connected to said head adapted to deliver gas to produce a wide heating flame of sheet-like form, and an additional tip connected to said head and disposed substantially parallel to and spaced from said first-mentioned tips, said additional tip being adapted to deliver gas to produce a preheating flame adjacent said heating flame at a region between the edges thereof.

17. The combination of a blowpipe comprising an elongated head, a series of tips connected to said head adapted to deliver gas to produce a wide heating flame of sheet-like form, an additional tip connected to said head and adapted to deliver gas to produce a preheating flame above and adjacent said heating flame at a region intermediate the edges thereof; and means for guiding at least one welding rod past said preheating flame and into said heating flame.

18. In apparatus for operating upon rails and the like, the combination of means for producing a wide heating flame substantially the width of the work, such as the top surface of a rail head; and means for supporting such heating means on the rail head at a substantial distance behind the area operated upon by said flame.

19. In apparatus for operating upon rails and the like, the combination of means for producing a wide heating flame substantially the width of the top surface of a rail head or the like; and a carriage for fulcruming such heating means upon the rail head and including means cooperating with an edge of said rail head for guiding said heating means along the rail.

20. In apparatus for depositing metal onto rails and the like, the combination of means for producing a wide heating flame of sheet-like form extending substantially across the width of the top surface of a rail or the like; means for guiding a welding rod into said flame at a point substantially midway between the side edges thereof; and a carriage for supporting at least part of the weight of such heating means and such rod guiding means, said carriage having means to guide the same along the rail or the like.

21. The method of building up worn rail ends which comprises applying to successive areas of a worn surface a high-temperature heating flame extending substantially across the width of said surface; and melting metal in the central portion of said flame, such molten metal flowing onto such successively heated areas at regions substantially central with respect to the lateral edges of said surface and tending to flow outwardly to the lateral edges.

22. A method of building up battered rail ends which consists in heating the surface of the rail head to be built up by means of a torch having a plurality of tips disposed transversely to the rail with their flames applied between the confines of the rail head surface and distributed in overlapping relation thereover, and depositing from above the rail welding material substantially over the width of the tread surface of the rail.

23. A method of building up battered rail ends which consists in uniformly heating in one operation the surface of the rail head to be built up, throughout the width thereof, and at the same time feeding and depositing welding material over said entire heated surface, thereby confining heat penetration in the rail head to near the surface thereof.

24. A method of building up battered rail ends which consists in uniformly heating in one simultaneous operation the surface of the rail head to be built up, throughout the width thereof, and depositing at the same time welding material over said surface from a welding rod of uniform size held above the rail and moved therealong, thereby confining heat penetration in the rail head to near the surface thereof.

25. A method of building up battered rail ends which consists in uniformly and simultaneously heating the surface of the rail head to be built up by means of a multiple flame torch applied to the rail head throughout the width thereof, and depositing welding material over said surface from a welding rod of uniform size held above the rail and moved therealong.

26. A method of building up battered rail ends which consists in uniformly heating the surface of the rail head to be built up, throughout the width thereof, and depositing from above the rail welding material over said surface from a welding rod having a uniform cross sectional area and having a sufficient size to cover substantially the width of the tread surface of the rail incident to its deposition thereon.

27. Portable apparatus for heating or welding metal work comprising, in combination, a carriage movable along the work and having a supporting means adapted to engage the top surface of the work and also having guiding means adapted to engage at least one normal lateral edge of the work for guiding the apparatus along a path determined by the contour of such normal lateral edge; and means secured to said carriage for applying high-temperature heat to the top surface of the work.

28. Portable apparatus for heating or welding metal work comprising, in combination, a carriage adapted to be propelled along the work, said carriage having supporting means adapted to engage the top surface of the work, said carriage also having means adapted to cooperate with both lateral edges of the work to guide said carriage as it is propelled along the work; and a blowpipe secured to said carriage and adapted to apply high-temperature heat to the top surface of the work, said blowpipe having means for producing an elongated high-temperature heating flame transversely of the direction of movement of said carriage along the work.

29. Portable apparatus for use in building up worn rails or in heat treating rails, said apparatus comprising, in combination, a carriage adapted to be propelled along a rail, said carriage having supporting means adapted to engage the top surface of the head of the rail, said carriage also having means adapted to cooperate with both lateral edges of the head of the rail to guide said carriage when it is propelled along the rail; and a blowpipe secured to said carriage and adapted to apply high-temperature heat to the top surface of the head of the rail, said blowpipe having a plurality of tips aligned transversely of the rail and adapted to produce an elongated high-temperature heating flame substantially as wide as the top surface of the head of the rail.

30. The method of depositing metal on surfaces of rails and the like which comprises applying to successive areas of a surface a high temperature heat in the form of a sheet-like flame extending substantially across the width of the surface; and, during the application of such heat, flowing molten metal onto such successively heated areas at regions substantially central with respect to the lateral edges of said surface, such molten metal tending to flow toward the lateral edges of said surfaces.

31. A method of building up battered rail ends which consists in uniformly heating in one simultaneous operation the surface of the rail head to be built up, throughout the width thereof, and depositing at the same time welding material over said surface from at least one welding rod of uniform size held above the rail and moved therealong.

32. A method of building up battered rail ends which consists in heating the surface of the rail head to be built up by means of a torch having a plurality of tips disposed transversely to the rail with their individual flames applied between the confines of the rail head surface and distributed thereover in the form of a single sheet-like flame, and depositing from above the rail welding material which is adapted to cover substantially the width of the tread surface of the rail.

33. A method of building up battered rail ends which consists in uniformly heating in one operation the surface of the rail to be built up, throughout the width thereof, and at the same time depositing welding material over said entire heated surface.

34. The combination of means, movable along a metal article, for applying high temperature heat to a surface of said article, in one operation and throughout the width thereof; means adapted to engage said surface to support at least part of the weight of such heat-applying means during the movement thereof along the surface; and means adapted to engage spaced lateral edges of said surface to guide said heat-applying means during such movement.

35. The combination of means, movable along a rail, for applying high temperature heat to the top surface of the head of said rail; means adapted to engage said surface to support at least part of the weight of such heat-applying means during the movement of the latter along said rail; and means adapted to simultaneously engage both lateral edges of the rail head to guide said heat-applying means during such movement.

ROBERT J. KEHL.